United States Patent
Hagiwara

(10) Patent No.: US 8,352,181 B2
(45) Date of Patent: Jan. 8, 2013

(54) NAVIGATION SYSTEM, IN-VEHICLE NAVIGATION APPARATUS AND CENTER APPARATUS

(75) Inventor: Kazuhiko Hagiwara, Nagoya (JP)

(73) Assignee: Denso Corporation, Kariya (JP)

( * ) Notice: Subject to any disclaimer, the term of this patent is extended or adjusted under 35 U.S.C. 154(b) by 1324 days.

(21) Appl. No.: 11/998,359

(22) Filed: Nov. 29, 2007

(65) Prior Publication Data

US 2009/0182497 A1 Jul. 16, 2009

(30) Foreign Application Priority Data

Dec. 1, 2006 (JP) ................................. 2006-325593

(51) Int. Cl.
*G01C 21/00* (2006.01)
*G01C 21/34* (2006.01)
*G01C 21/20* (2006.01)
*G01C 21/26* (2006.01)

(52) U.S. Cl. ........ 701/436; 701/420; 701/437; 701/454; 701/468; 701/523

(58) Field of Classification Search .......... 701/200–223, 701/400–541; 340/995.1–995.28, 995.2, 340/995.23
See application file for complete search history.

(56) References Cited

U.S. PATENT DOCUMENTS

| | | | |
|---|---|---|---|
| 6,222,583 B1 * | 4/2001 | Matsumura et al. | 348/113 |
| 7,039,521 B2 * | 5/2006 | Hortner et al. | 701/211 |
| 7,216,035 B2 * | 5/2007 | Hortner et al. | 701/435 |
| 7,353,110 B2 * | 4/2008 | Kim | 701/211 |
| 7,603,230 B2 | 10/2009 | Suzuki et al. | |
| 7,634,110 B2 * | 12/2009 | Oka et al. | 382/104 |
| 7,728,869 B2 * | 6/2010 | Jung | 348/113 |
| 7,733,244 B2 * | 6/2010 | Asada | 340/995.1 |
| 7,783,422 B2 * | 8/2010 | Tanaka | 701/211 |
| 8,180,567 B2 * | 5/2012 | Geelen et al. | 701/431 |
| 2003/0032436 A1 * | 2/2003 | Mikuni | 455/457 |
| 2005/0107952 A1 * | 5/2005 | Hoshino et al. | 701/211 |
| 2006/0155463 A1 * | 7/2006 | Adachi | 701/208 |
| 2006/0155466 A1 * | 7/2006 | Kanda et al. | 701/209 |

(Continued)

FOREIGN PATENT DOCUMENTS

JP 10-132598 5/1998

(Continued)

OTHER PUBLICATIONS

Office Action dated May 17, 2011 from the Japanese Patent Office in corresponding Japanese Application No. 2006-325593.

(Continued)

*Primary Examiner* — Khoi Tran
*Assistant Examiner* — Dale Moyer
(74) *Attorney, Agent, or Firm* — Harness, Dickey & Pierce, PLC

(57) ABSTRACT

In a communication type navigation system, a center apparatus receives a present position and destination from an in-vehicle navigation apparatus and thereby calculates a route by searching map data, which is constantly updated. The in-vehicle navigation apparatus receives the calculated route with course information from the center apparatus. When approaching a passing point included in the route, the navigation apparatus displays the course information in the travel direction in superimposition on a forward image around the passing point. The route guide can be thus appropriately performed to follow an actual road state. The above configuration of the system helps prevent problems in costs and workloads resulting from an in-vehicle navigation apparatus holding map data therein.

13 Claims, 8 Drawing Sheets

U.S. PATENT DOCUMENTS

| | | | |
|---|---|---|---|
| 2006/0210114 A1* | 9/2006 | Oka et al. | 382/104 |
| 2007/0083324 A1* | 4/2007 | Suzuki et al. | 701/201 |
| 2007/0233370 A1* | 10/2007 | Asada | 701/208 |
| 2007/0233380 A1* | 10/2007 | Tanaka | 701/211 |
| 2008/0114534 A1 | 5/2008 | Yamazaki et al. | |
| 2009/0005961 A1* | 1/2009 | Grabowski et al. | 701/200 |
| 2009/0125234 A1* | 5/2009 | Geelen et al. | 701/209 |
| 2009/0132162 A1* | 5/2009 | Kudoh et al. | 701/201 |
| 2010/0070162 A1* | 3/2010 | Aihara | 701/201 |
| 2010/0070173 A1* | 3/2010 | Sakamoto | 701/209 |
| 2012/0226437 A1* | 9/2012 | Li et al. | 701/423 |

FOREIGN PATENT DOCUMENTS

| | | |
|---|---|---|
| JP | 11-23305 | 1/1999 |
| JP | 2000-149193 | 5/2000 |
| JP | 2002-107169 | 4/2002 |
| JP | 2002-340573 | 11/2002 |
| JP | 2003-287434 | 10/2003 |
| JP | 2003-315069 | 11/2003 |
| JP | 2005-134209 | 5/2005 |
| WO | WO97/31241 | 1/1999 |
| WO | WO2004/048895 | 6/2004 |
| WO | WO 2005040724 A1 * | 5/2005 |
| WO | WO2006/072997 | 7/2006 |

OTHER PUBLICATIONS

Office Action dated Dec. 6, 2011 in corresponding Japanese Application No. 2006-325593.

* cited by examiner

NAVIGATION SYSTEM, IN-VEHICLE NAVIGATION APPARATUS AND CENTER APPARATUS

CROSS REFERENCE TO RELATED APPLICATION

This application is based on and incorporates herein by reference Japanese Patent Application No. 2006-325593 filed on Dec. 1, 2006.

FIELD OF THE INVENTION

The present invention relates to a navigation system, an in-vehicle navigation apparatus, and a center apparatus. The navigation system includes the foregoing two apparatuses, which communicate with each other via a communication network.

BACKGROUND OF THE INVENTION

An in-vehicle navigation apparatus holds or stores map data. When a destination is designated, the navigation apparatus calculates a route from a present position to the destination by searching the map data and superimposes the calculated route on a map displayed to thereby perform a route guide.

Incidentally, road states constantly change by accompanying openings or closings of traffics in roads. The navigation apparatus is thus required to update the map data to match with the changes of the road states so that route guides can be performed appropriately. Methods for updating map data include for example, purchasing DVDs having the newest map data, demounting HDDs (Hard Disk Drives) to update the map data at makers or dealers, and downloading the newest map data from center servers. The above methods, however, involve various problems. Purchasing DVDs may involve a cost problem. Demounting and re-mounting HDDs may involve a workload problem. Downloading a large data volume of map data including the newest may involve a time problem.

In contrast, Patent document 1 discloses the following method: capturing a forward image in the travel direction of a vehicle; preparing route course information based on road data indicating connections of roads, e.g., major roads; and superimposing to display the course information on the captured forward image in the travel direction to thereby perform a route guide.

In Patent document 1, however, although the navigation apparatus need not have detail map data, but need to have at least road data simpler than the map data. This requires the navigation apparatus to update the road data for constantly performing an appropriate route guide.
Patent document 1: JP-H10-132598 A

SUMMARY OF THE INVENTION

The present invention is made in view of the above-mentioned situation. It is an object to provide a navigation system, and cooperative apparatuses of an in-vehicle navigation apparatus and a center apparatus. In the system, the in-vehicle navigation apparatus can be provided to follow actual road states to thereby perform a route guide appropriately without need of having map data or road data.

As a first example of the present invention, a navigation system is provided as follows. The system includes a center apparatus and an in-vehicle navigation apparatus in a vehicle. The center apparatus is communicable with the in-vehicle navigation apparatus via a communication network. The center apparatus comprises: (1) a center communication device configured to communicate with the in-vehicle navigation apparatus for receiving a present position and a destination from the in-vehicle navigation apparatus; (2) a route calculation device configured to calculate a route from the present position to the destination by searching map data; and (3) a center control device configured to extract a passing point in the route, calculate course information indicating a course at the passing point the vehicle is to take, and cause the center communication device to send the course information along with the passing point to the in-vehicle navigation apparatus. The in-vehicle navigation apparatus comprises: (1) a present position designation unit configured to designate a present position; (2) a destination designation unit configured to designate a destination; (3) an in-vehicle communication device configured to communicate with the center apparatus for sending the present position and the destination and receiving the course information along with the passing point; (4) a forward image capture unit configured to capture a forward image including the received passing point in a travel direction of the vehicle; and (5) an in-vehicle control device configured to display (i) the captured forward image and (ii) the received course information, which is superimposed on the displayed forward image, when a present position designated by the present position designation unit approaches the received passing point. Here, in the center apparatus, when the route calculation device calculates multiple routes from the present position to the destination by searching the map data, the center control device (i) extracts a passing point included in one of the multiple routes, the one of the multiple routes being selected in the in-vehicle navigation apparatus, (ii) calculates course information indicating a course at the extracted passing point included in the one of the multiple routes, and (iii) causes the center communication device to send the calculated course information along with the passing point included in the one of the multiple routes to the in-vehicle navigation apparatus.

Thus, the in-vehicle navigation apparatus does not calculate the route. Instead, the center apparatus calculates the route from the present position to the destination by searching the map data. When approaching the passing point included in the route, the in-vehicle navigation apparatus displays the received course information in superimposition on the forward image including the passing point in the travel direction. The route guide can be thus appropriately performed to follow an actual road state. In such a case, the in-vehicle navigation apparatus need not hold map data. The above configuration of the system thus helps prevent problems in costs and workloads resulting from an in-vehicle navigation apparatus holding map data.

Moreover, the route guide can be performed appropriately to follow actual road states with respect to the route selected by a user of the vehicle from multiple candidate routes calculated in the center apparatus.

As a second example of the present invention, a navigation system is provided as follows. The system includes a center apparatus and an in-vehicle navigation apparatus in a vehicle. The center apparatus is communicable with the in-vehicle navigation apparatus via a communication network. The center apparatus comprises: (1) a communication device configured to communicate with the in-vehicle navigation apparatus for receiving a present position and a destination from the in-vehicle navigation apparatus; (2) a route calculation device configured to calculate a route from the present position to the destination by searching map data; and (3) a center control device configured to extract a passing point in the route, calculate vector information indicating a vector from the present position to the passing point and a vector from the present position to the destination, and cause the center communication device to send the vector information along with the passing point to the in-vehicle navigation apparatus. The in-vehicle navigation apparatus comprises: (1) a present position designation unit configured to designate a present position; (2) a destination designation unit configured to designate a destination; (3) an in-vehicle communication device configured to receive the vector information along with the passing point; (4) a forward image capture unit configured to capture a forward image including the received passing point in a travel direction of the vehicle; and (5) an in-vehicle control device configured to display (i) the captured forward image and (ii) course information, which is based on the received vector information and is superimposed on the displayed forward image, when a present position designated by the present position designation unit approaches the received passing point.

Thus, the in-vehicle navigation apparatus does not calculate the route. Instead, the center apparatus calculates the route from the present position to the destination by searching the map data. When approaching the passing point included in the route, the in-vehicle navigation apparatus displays the course information obtained based on the vector information received from the center apparatus in superimposition on the forward image around the passing point in the travel direction. Thus, similarly with the first example, the route guide can be appropriately performed to follow actual road states. Also in the above configuration, the in-vehicle navigation apparatus need not hold map data. This helps prevent problems in costs and workloads resulting from an in-vehicle navigation apparatus holding map data.

As a third example of the present invention, a navigation apparatus in a vehicle is provided to be communicable with a center apparatus via a communication network. Here, the center apparatus calculates a route from a present position to a destination by searching map data, extracts a passing point in the calculated route, calculates vector information indicating vectors from the present position to the passing point and from the present position to the destination, and sends the passing point and the vector information to the navigation apparatus. The navigation apparatus comprises: (1) a present position designation unit configured to designate a present position; (2) a destination designation unit configured to designate a destination; (3) an in-vehicle communication device configured to send the designated present position and the designated destination to the center apparatus and receive the passing point and the course information from the center apparatus; (4) a forward image capture unit configured to capture a forward image in a travel direction of the vehicle; and (5) an in-vehicle control device configured to cause a display device to display (i) the captured forward image including the received passing point in the travel direction and (ii) course information based on the received vector information such that the course information is superimposed on the displayed forward image when a present position designated by the present position designation unit approaches the received passing point.

As a fourth example of the present invention, a center apparatus is provided to be communicable with a navigation apparatus in a vehicle via a communication network. The navigation apparatus displays a forward image in a travel direction and course information based on vector information received from the center apparatus such that the course information is superimposed on the displayed forward image, when a present position of the vehicle approaches a passing point received from the center apparatus. The center apparatus comprises: (1) a center communication device configured to communicate with the navigation apparatus for receiving the present position and the destination; (2) a map data storage unit configured to store map data; (3) a route calculation device configured to calculate a route from the received present position to the received destination by searching the stored map data; and (4) a center control device configured to extract a passing point in the calculated route, calculate vector information indicating vectors from the present position to the passing point and from the present position to the destination, and cause the center communication device to send the vector information along with the passing point included in the route to the navigation apparatus.

Thus, if the navigation apparatus of the third example and the center apparatus of the fourth example are used cooperatively, similar advantages from the navigation system of the second example can be provided.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
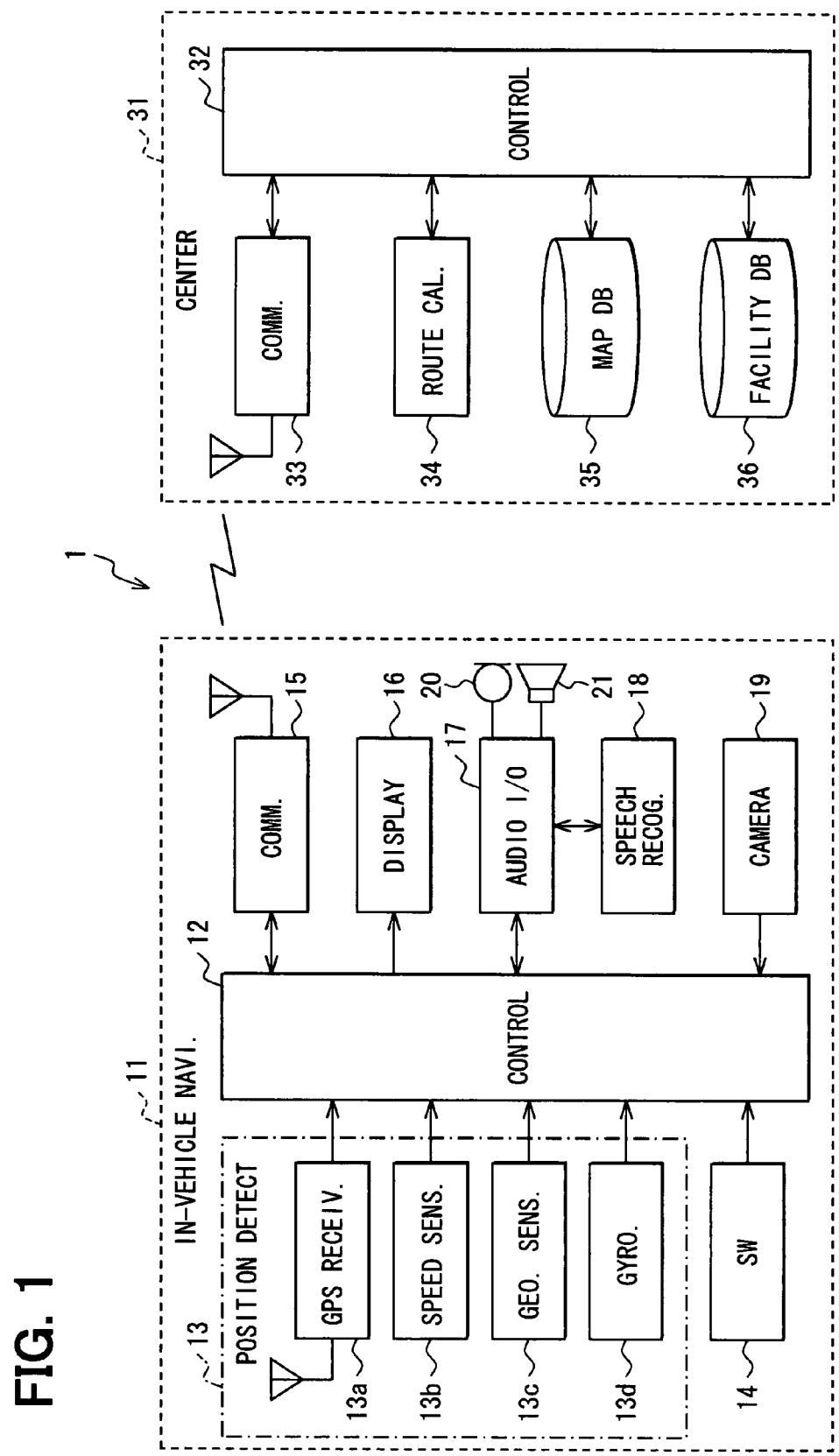
FIG. 1 is a functional block diagram of a configuration of a communication type navigation system according to an embodiment of the present invention.
Figure 2:
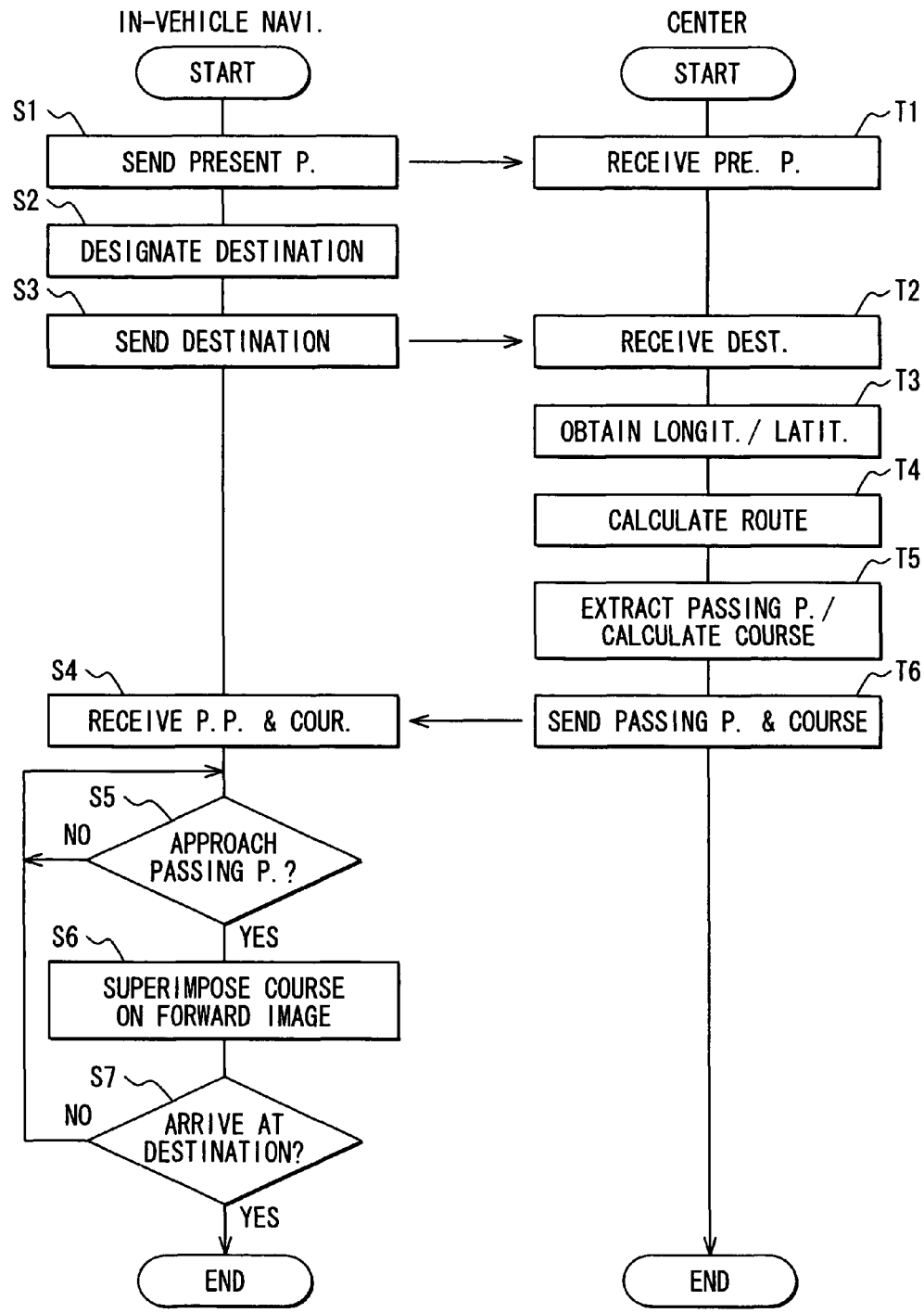
FIG. 2 is a flowchart of a cooperative process according to the first embodiment.

A first embodiment according to the present invention will be explained with reference to FIGS. 1 to 8. FIG. 1 illustrates an overall configuration of a communication type navigation system according to the first embodiment. The communication type navigation system 1 includes an in-vehicle navigation apparatus 11 mounted in a subject vehicle and a center apparatus 31 arranged in a center. The in-vehicle navigation apparatus 11 and the center apparatus 31 communicate with each other through a communication network (e.g., mobile phone network, fixed-line telephone network).

The in-vehicle navigation apparatus 11 includes the following: an in-vehicle control device 12 (which may function as a present position designation means or unit, or a destination designation means or unit); a position detection device 13; an operation switch 14; an in-vehicle communication device 15; a display device 16; an audio input/output device 17; a speech recognition device 18; and an in-vehicle camera 19 (which may function as an image capture means or unit).

The control device 12 includes a CPU, ROM, RAM, I/O interface, and a bus connecting the foregoing components (non illustrated) to control an overall operation of the in-vehicle navigation apparatus 11. The position detection device 13 includes a GPS (Global Positioning System) receiver 13a, a speed sensor 13b, a geomagnetic sensor 13c, and a gyroscope 13d. The components 13a to 13d of the position detection device 13 individually have different types of detection errors from each other. Thus, when detection signals are inputted from individual components of the position detection device 13, the control device 12 complements the inputted detection signals mutually, and designates or detects a present position, a heading direction, a travel distance, etc. of the vehicle. In addition, all the components 13a to 13d of the position detection device 13 may not be necessary depending on required detection accuracy. Moreover, the position detection device 13 may further include a wheel sensor for detecting rotation of wheels or a rotation sensor for detecting rotation of a steering wheel.

The operation switch 14 includes a mechanical switch around the display device 16 or a touch-sensitive switch on a screen (e.g., liquid crystal display) in the display device 16. The communication device 15 executes a communication operation through the communication network with the center apparatus 31. The display device 16 includes, for example, a color liquid crystal display unit. The display device 16 displays a forward image in the travel direction of the vehicle captured by the in-vehicle camera 19, and displays a present position mark or a swept path of the vehicle in superimposition on the displayed forward image. In addition, the display device 16 may include an organic electroluminescence (EL) display unit or a plasma display unit. The audio input/output device 17 performs speech processing of sounds input via a microphone 20 or sounds output via a speaker 21. The speech recognition device 18 performs speech recognition of sounds input via the microphone 20.

The center apparatus 31 includes a center control device 32; a center communication device 33, a route calculation device 34 (which may function as a route calculation means or unit), a map database 35 (which may function as a map data storage means or unit), and a facility database 36 (which may function as a facility data storage means or unit). The center control device 32 includes a CPU, ROM, RAM, I/O interface, and bus connecting the foregoing components (non illustrated) to control an overall operation of the center apparatus 31. The center communication device 33 executes a communication operation through the communication network with the in-vehicle navigation apparatus 11. When receiving a route calculation command signal from the center control device 32, the route calculation device 34 calculates a route from a present position to a destination, both of which are received via the center communication device 33 from the in-vehicle navigation apparatus 11 and outputs the calculated route to the center control device 32.

The map database 35 includes map data. When receiving a read command signal from the center control device 32, the map database 35 outputs map data demanded by the read command signal to the center control device 32. The facility database 36 includes data on facilities. When receiving a read command signal from the center control device 32, the facility database 36 outputs data on a facility demanded by the read command signal to the center control device 32.

An operation under the above configuration is explained with reference to FIGS. 2 to 8. In addition, the explanation is made based on the assumption that the in-vehicle navigation apparatus 11 and the center apparatus 31 are connected by a communication link.

If the in-vehicle navigation apparatus 11 is activated and the vehicle is in a travel state, the in-vehicle control device 12 designates a present position (latitude and longitude) periodically using the position detection device 13, and transmits the designated present position to the center apparatus 31 periodically via the in-vehicle communication device 15 (Step S1). In the center apparatus 31, the center control device 32 receives the present position from the in-vehicle navigation apparatus 11 via the center communication device 33 and stores the received present position (Step T1). Thereafter, in the center apparatus 31, each time receiving the present position from the in-vehicle navigation apparatus 11 via the center communication device 33, the center control device 32 updates the stored present position.

In the in-vehicle navigation apparatus 11, the control device 12 designates a destination according to a user's input operation using the operation switch 14 (Step S2). The designated destination is transmitted as destination information to the center apparatus 31 via the in-vehicle communication device 15 (Step S3). Here, the destination information transmitted to the center apparatus 31 may include an address, a telephone number, a facility name, and/or a map code (registered trademark) in respect to the designated destination.

Figure 3:
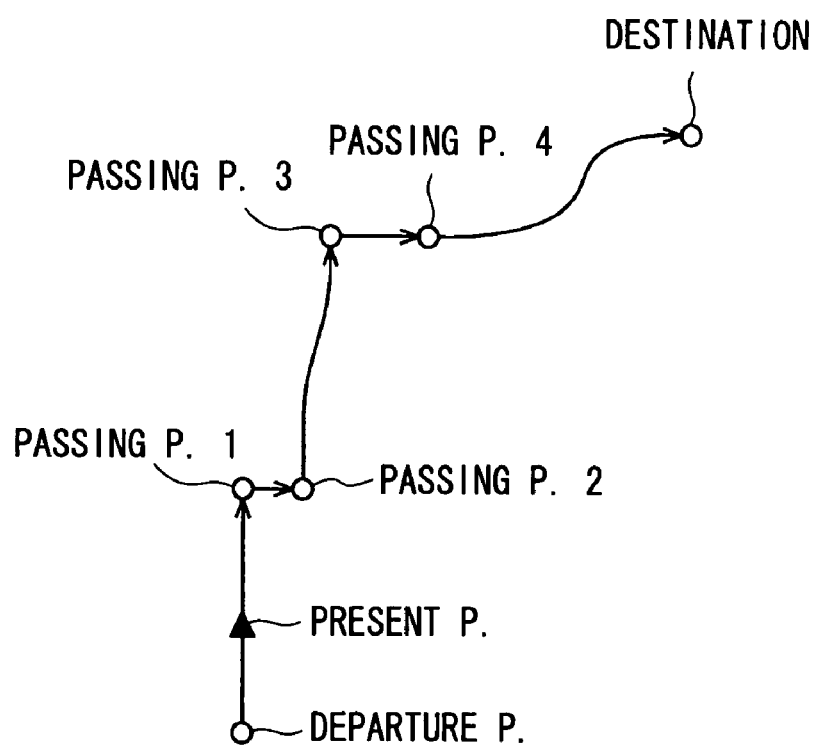
FIG. 3 is an example view schematically illustrating a route including passing points according to the first embodiment.
Figure 4:
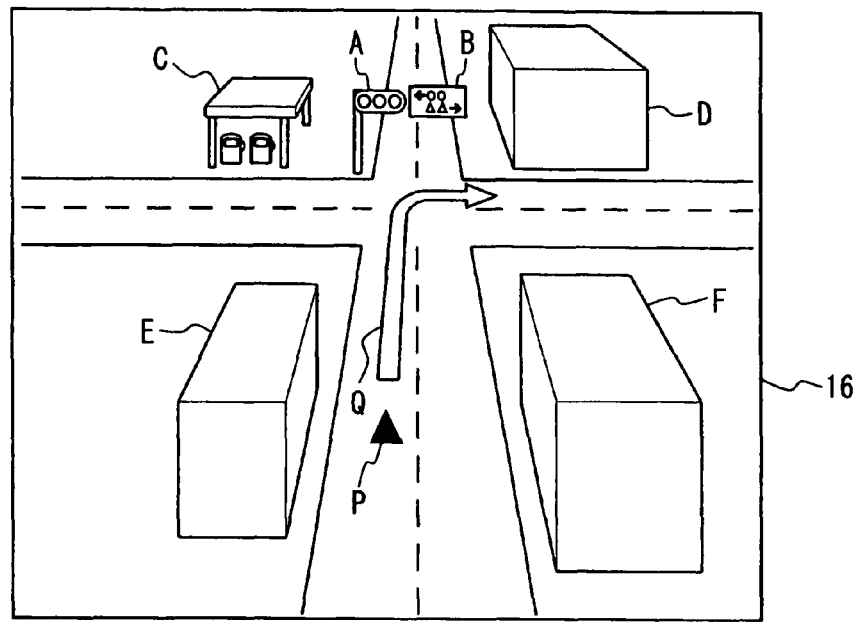
FIG. 4 is an example display window illustrating a forward image around a present position with course information according to the first embodiment.

In the center apparatus 31, the control device 32 receives the destination information from the in-vehicle navigation apparatus 11 via the center communication device 33 and stores the received destination information (Step T2). The latitude and longitude of the destination included in the destination information are acquired (Step T3). As illustrated in FIG. 3, a route from the present position to the destination is calculated by searching the map database, e.g., map data on an area including the present position and the destination (Step T4). Here, the present position used for calculating the route is the present position which is most recently received from the in-vehicle navigation apparatus 11. Each passing point (i.e., latitude and longitude) included in the calculated route is extracted and a course, which the vehicle should take at the extracted passing point, is calculated (Step T5). The passing point signifies a point, e.g., intersection, at which a road branches with respect to a vehicle travel direction. The center control device 32 transmits the extracted passing point and course information indicating the calculated course to the in-vehicle navigation apparatus 11 via the center communication device 33 (Step T6).

In the in-vehicle navigation apparatus 11, the control device 12 receives the passing point and course information in the route from the center apparatus 31 via the in-vehicle communication device 15 (Step S4). Then, a present position newly designated using the position detection device 13 is compared with the passing point received from the center apparatus 31 (Step S5). The control device 12 determines that the present position approaches the passing point (Step S5: Yes), i.e., it is determined that the vehicle approaches within a predetermined distance to the latitude and longitude of the passing point. The control device 12 causes the display device 16 to display the course information received from the center apparatus 31 and a mark of the present position in superimposition on the forward image around (i.e., including) the received passing point in the vehicle travel direction (Step S6). Here, the forward image is captured by the in-vehicle camera 19 at a time when the present position is determined to approach the received passing point at Step S5.

Then, the in-vehicle control device 12 compares a present position newly designated using the position detection device 13 with the destination (Step S7). When it is determined that the present position does not arrive at the destination (Step S7: No), the process returns to Step S5. That is, the in-vehicle control device 12 compares a present position newly designated using the position detection device 13 with the next passing point received from the center apparatus 31. When it is determined that a present position approaches the next passing point, the in-vehicle control device 12 causes the display device 16 to display the course information for the next passing point received from the center apparatus 31 and the present position mark in superimposition on the forward image in the vehicle travel direction including the next passing point, similarly. Here, the forward image is captured by the in-vehicle camera 19 at a time when the present position is determined to approach the next passing point at Step S5.

For instance, the in-vehicle control device 12 receives the course information, which indicates "right turn" at a corresponding passing point 1, from the center apparatus 31, as indicated in FIG. 3. When the present position approaches the passing point 1, the course information (illustrated as an arrow "Q" in FIG. 4) indicating "right turn" together with a present position mark (illustrated as "P" in FIG. 4) is superimposed on the forward image in the vehicle travel direction including the passing point 1 in a display window shown in the display device 16. Further, for instance, the in-vehicle control device 12 receives the course information which indicates "left turn" at a corresponding passing point 2 from the center apparatus 31, as indicated in FIG. 3. When the present position approaches the passing point 2, the course information indicating "left turn" together with a present position mark is superimposed on the forward image in the vehicle travel direction including the passing point 2 in the display device 16.

Figure 5:
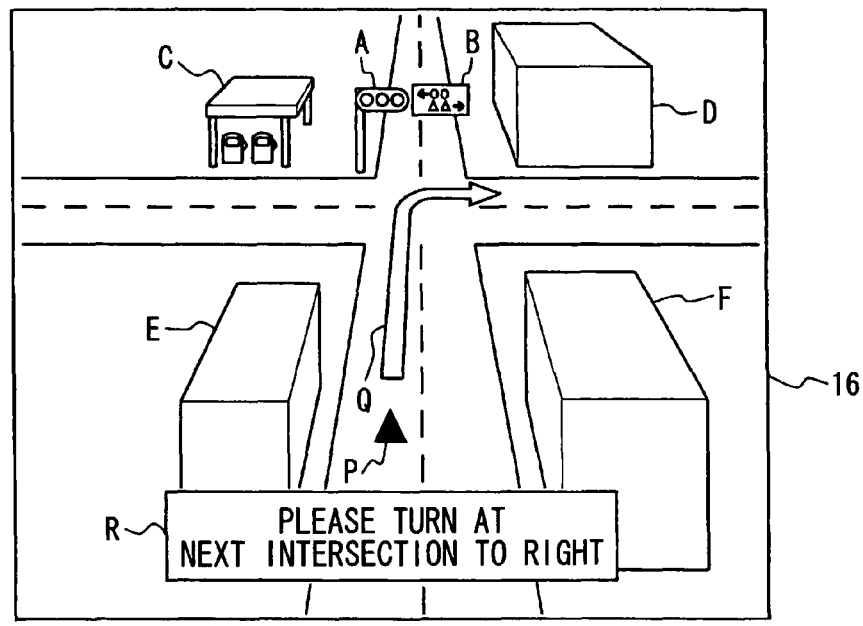
FIG. 5 is an example display window illustrating a forward image around a present position with another course information according to the first embodiment.
Figure 6:
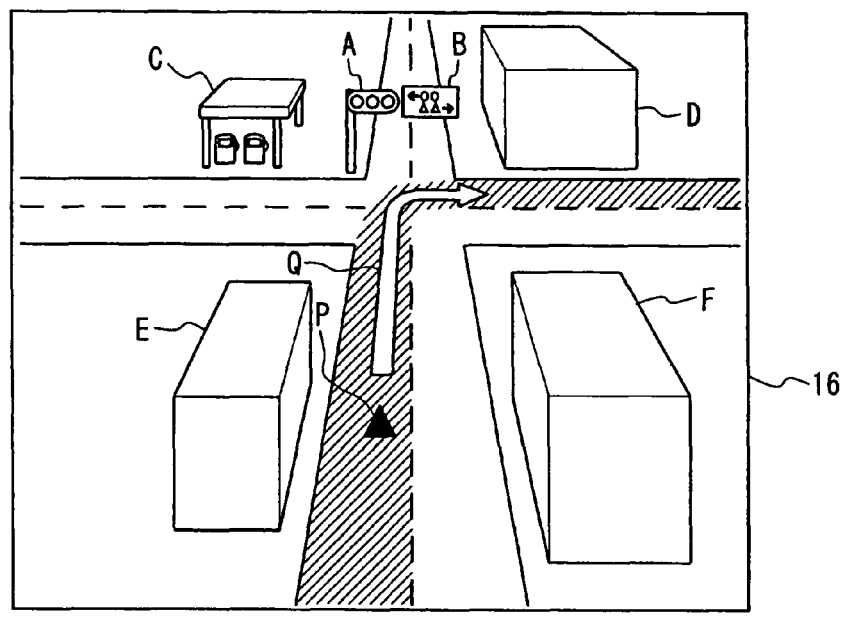
FIG. 6 is an example display window illustrating a forward image around a present position with yet another course information according to the first embodiment.

In addition, in the in-vehicle navigation apparatus 11, when the control device 12 determines that a present position approaches the passing point, an audio guidance can be simultaneously performed. That is, when the course information and the present position mark are displayed in superimposition on the forward image in the vehicle travel direction in the display device 16, an audio guidance for the route guide, such as "please turn at the next intersection to the right" is simultaneously sounded via the speaker 21 in order to notify a user of the course, for example. Moreover, the in-vehicle control device 12 may display a text guidance (illustrated as "R") of the route guide, such as "PLEASE TURN AT NEXT INTERSECTION TO RIGHT", in the display device 16, as illustrated in FIG. 5. Furthermore, the in-vehicle control device 12 may cause the display device 16 to display the course in highlight form (e.g., hatching illustrated in FIG. 6, or coloring, blinking, etc.).

Figure 7:
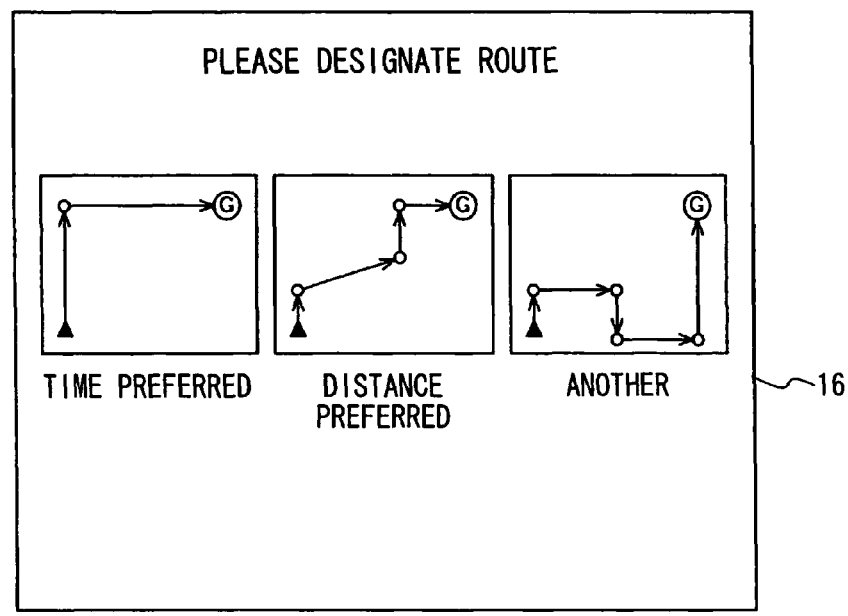
FIG. 7 is an example display window for designating a route according to the first embodiment.
Figure 8:
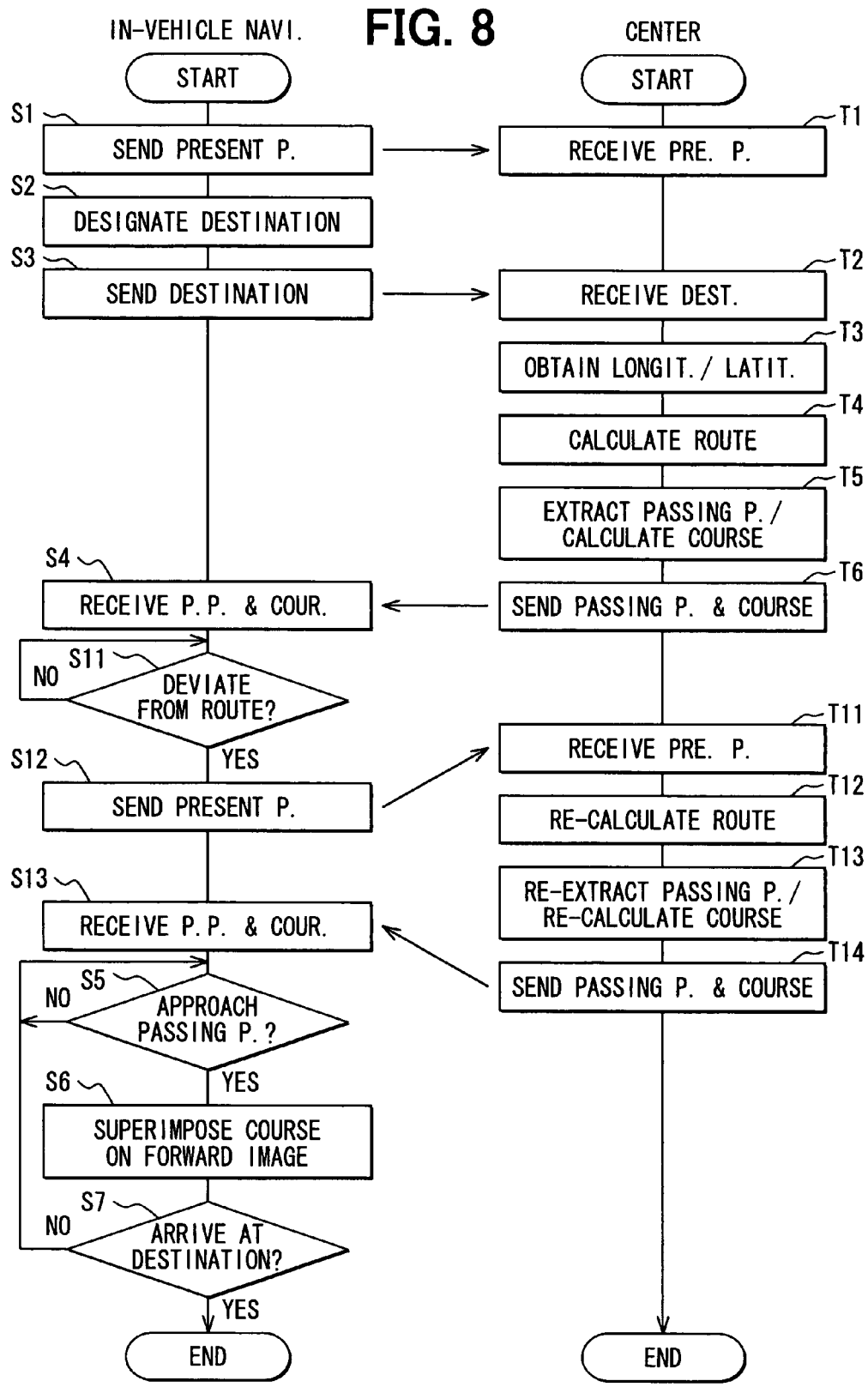
FIG. 8 is a flowchart of another cooperative process according to the first embodiment.

Moreover, in the center apparatus 31, the control device 32 may calculate multiple routes from the present position to the destination. In such a case, the calculated routes are transmitted to the navigation apparatus 11 via the center communication device 33. In the in-vehicle navigation apparatus 11, a user is required to select one of the multiple routes using a selection display window to show the multiple routes in the display device 16, as illustrated in FIG. 7. Then, the in-vehicle navigation apparatus 11 may receive a passing point and course information of the route selected by the user from the center apparatus 31 via the in-vehicle communication device 15.

In addition, in the in-vehicle navigation apparatus 11, the control device 12 may perform image processing which makes a mobile object nondisplayed in the forward image in the vehicle travel direction to display it in the display device 16. For example, information such as a pedestrian unnecessary for route guides can be excluded from the forward image in the vehicle travel direction; therefore, a route guide can be performed more appropriately.

Alternatively, a characteristic point of a road may be extracted from the captured forward image in the vehicle travel direction, and a road form may be thereby displayed in the display device 16. The road can be thus recognized more clearly in the forward image in the travel direction; therefore, a route guide can be performed more appropriately.

Furthermore, in the center apparatus 31, the control device 32 may search the facility database to thereby extract data on a facility around the passing point and transmit the extracted data on the facility to the in-vehicle navigation apparatus 11 via the communication device 33. In the in-vehicle navigation apparatus 11, the control device 12 may superimpose the data on the facility on the captured forward image in the travel direction in the display device 16. For instance, in superimposition on the forward image in the travel direction, the in-vehicle control device 12 displays a traffic signal mark (illustrated as "A" in FIGS. 4 to 6) showing a traffic signal, a road sign mark (illustrated as "B" in FIGS. 4 to 6) showing a road sign, and building marks (illustrated as "C," "D," "E," and "F" in FIGS. 4 to 6) showing buildings in display windows appearing in the display device 16. Thus, the passing point can be recognized more clearly; therefore, a route guide can be performed more appropriately.

The above explanation is made on the assumption that the vehicle travels from the present position to the destination without deviating from the route, which is calculated by the center apparatus 31. The vehicle may, however, deviate from the route calculated by the center apparatus 31. In such a case, the in-vehicle control device 12 executes a process illustrated in FIG. 8.

While comparing the present position with the passing point received from the center apparatus 31, the control device 12 determines that the vehicle deviates from the route calculated by the center apparatus 31 (Step S11: Yes). Immediately thereafter, the in-vehicle control device 12 designates a present position and transmits the designated present position to the center apparatus 31 via the in-vehicle communication device 15 (Step S12).

In the center apparatus 31, the control device 32 receives the present position from the in-vehicle navigation apparatus 11 via the communication device 33 (Step T11). A route from the currently received present position to the destination is re-calculated by searching the map database (Step T12). Each passing point in the re-calculated route is re-extracted and a course which the vehicle should take at the extracted passing point is re-calculated (Step T13). The control device 32 transmits the re-extracted passing point and course information indicating the re-calculated course to the in-vehicle navigation apparatus 11 via the center communication device 33 (Step T14).

In the in-vehicle navigation apparatus 11, the control device 12 receives the passing point in the route and course information for the passing point from the center apparatus 31 via the communication device 15 (Step S13). The process then repeats above-mentioned Steps S5 to S7.

In addition, when the vehicle deviates from the route calculated by the center apparatus 31, a normal swept path the vehicle travels without deviation and an abnormal swept path the vehicle travels after deviating from the route may be displayed separately or distinctively from each other in the display device 16. Thus, a user may be notified of the vehicle having deviated from the route. In contrast, the above normal and abnormal swept paths may be displayed indistinctively from each other in the display device 16. Thus, a user may be not notified of the vehicle having deviated from the route.

As explained above, according to the communication type navigation system 1 of the first embodiment, in the center apparatus 31, a present position and destination are received from the in-vehicle navigation apparatus 11 and a route is calculated based on the received present position and destination by searching the map database. In the in-vehicle navigation apparatus 11, when approaching a passing point included in the route, the course information at the passing point is displayed in superimposition on the forward image including the passing point in the travel direction. The route guide can be thus appropriately performed to follow an actual road state. Further, in such a case, the in-vehicle navigation apparatus 11 need not hold map data. The above configuration of the system thus helps prevent problems in costs and workloads resulting from an in-vehicle navigation apparatus holding the map data.

Second Embodiment

Figure 9:
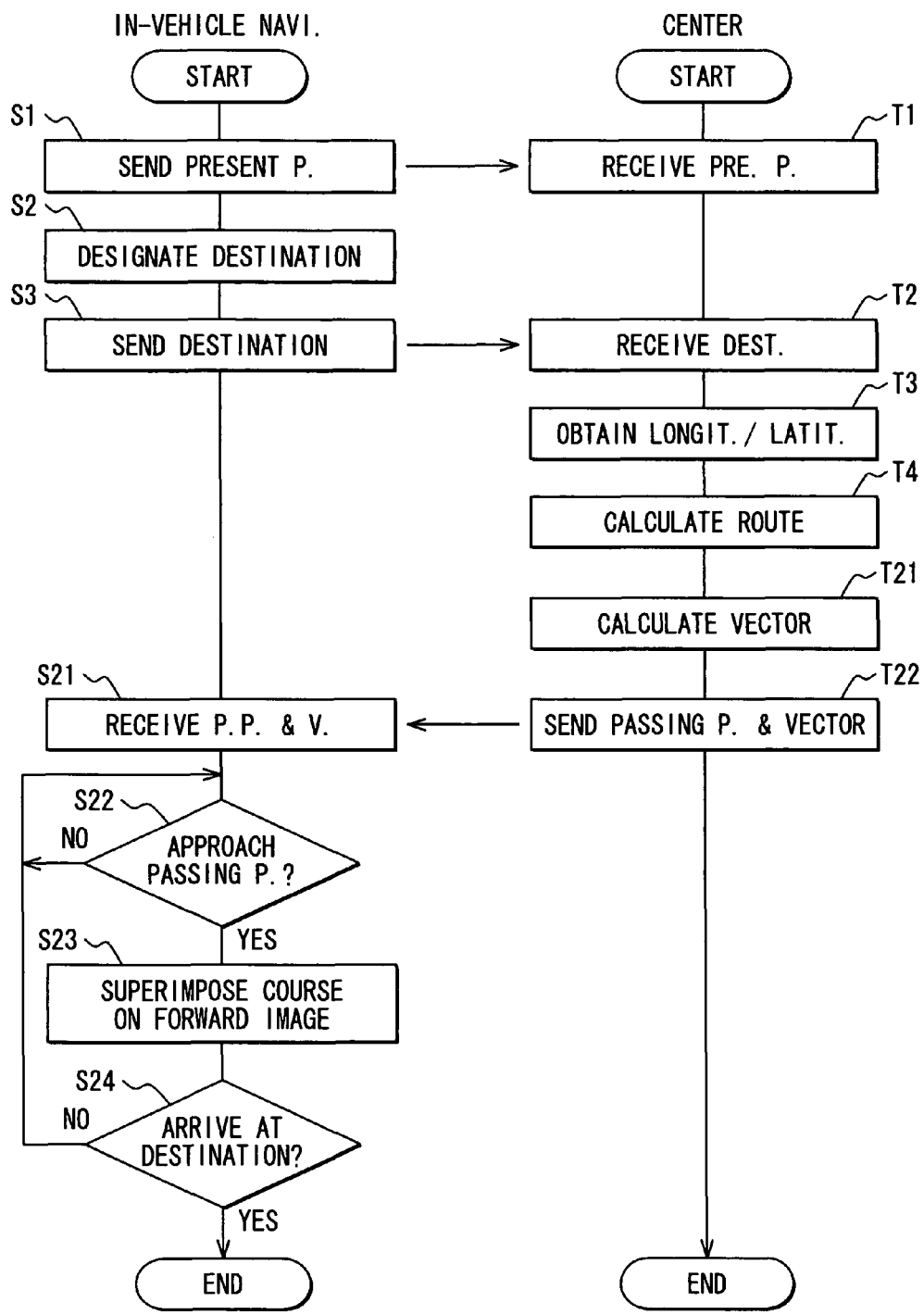
FIG. 9 is a flowchart of a cooperative process according to a second embodiment of the present invention.
Figure 10:
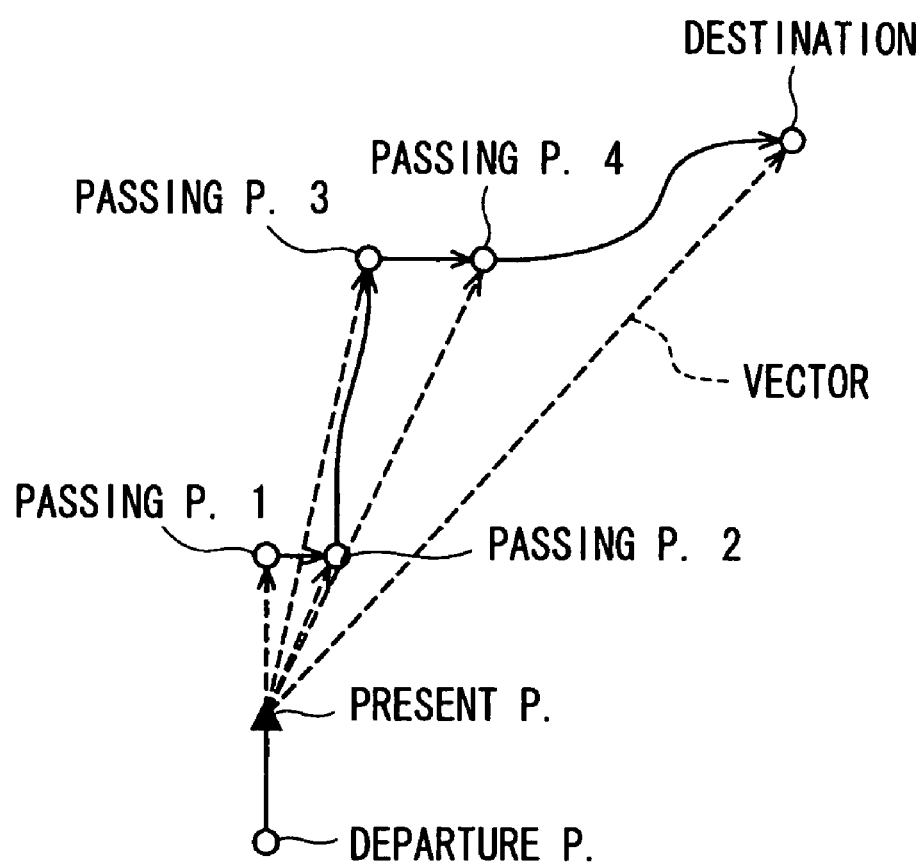
FIG. 10 is an example view schematically illustrating a route including passing points according to the second embodiment.

A second embodiment according to the present invention is explained with reference to FIGS. 9, 10. In addition, explanation is omitted for the same parts as those in the first embodiment and made for the different parts from the first embodiment. The center apparatus 31 of the second embodiment differs from that of the first embodiment in that vectors from the present position to the passing point and from the present position to the destination are further calculated while the passing point is similarly extracted from the route. That is, in the center apparatus 31, the control device 32 receives a present position (latitude and longitude) from the in-vehicle navigation apparatus 11 via the communication device 33 (Step T1). The control device 32 then receives a destination from the in-vehicle navigation apparatus 11 via the communication device 33 (Step T2). The latitude and longitude of the received destination are acquired (Step T3). As illustrated in FIG. 10, a route from the currently received present position to the destination is calculated by searching the map database (Step T4). In the second embodiment, each passing point in the calculated route is extracted and vectors are calculated from the present position to the passing point and from the present position to the destination (Step T21). The center control device 32 transmits the extracted passing point and vector information indicating the calculated vectors to the in-vehicle navigation apparatus 11 via the center communication device 33 (Step T22).

In the in-vehicle navigation apparatus 11, the control device 12 receives the passing point and vector information from the center apparatus 31 via the communication device 15 (Step S21). A present position designated using the position detection device 13 is then compared with the passing point received from the center apparatus 31 (Step S22). The control device 12 determines that the present position approaches the passing point (Step S22: Yes). The control device 12 causes the display device 16 to display course information based on the vector information received from the center apparatus 31 in superimposition on the forward image in the vehicle travel direction including the passing point (Step S23). Here, the forward image is captured by the in-vehicle camera 19 at a time when the present position is determined to approach the passing point at Step S22. That is, the in-vehicle control device 12 calculates a difference vector between the vector from the present position to the passing point and the vector from the present position to the destination; thereby, the course information explained in the first embodiment is calculated. The calculated course information is superimposed in a display window appearing in the display device 16.

The in-vehicle control device 12 then compares a present position newly designated and the destination with each other (Step S24). When it is determined that the present position does not arrive at the destination (Step S24: No), the process returns to Step S22. That is, the in-vehicle control device 12 compares a present position newly designated using the position detection device 13 with the next passing point received from the center apparatus 31. When it is determined that the present position approaches the next passing point, the in-vehicle control device 12 causes the display device 16 to display the course information based on the vector information received from the center apparatus 31 in superimposition on the forward image in the vehicle travel direction including the next passing point, similarly. Here, the forward image is captured by the in-vehicle camera 19 at a time when the present position is determined to approach the next passing point at Step S22.

In addition, in the second embodiment, the vehicle may similarly deviate from the route calculated by the center apparatus 31. In such a case, in the center apparatus 31, immediately after it is determined that the vehicle deviates from the route calculated by the center apparatus 31, the in-vehicle control device 12 designates a present position and transmits it to the center apparatus 31 via the communication device 15. In the center apparatus 31, the control device 32 searches the map data, e.g., map data including an area including the present position transmitted newly from the in-vehicle navigation apparatus 11 and the destination, and re-calculates the route from the present position to the destination. Each passing point in the re-calculated route is re-extracted and vectors is re-calculated from the present position to the re-extracted passing point and from the present position to the destination.

As explained above, according to the communication type navigation system 1 of the second embodiment, in the center apparatus 31, a present position and destination are received from the in-vehicle navigation apparatus 11 and a route is calculated based on the received present position and destination by searching the map database. In the in-vehicle navigation apparatus 11, when approaching a passing point included in the route, the course information is displayed based on the vector information received from the center apparatus 31 in superimposition to the captured forward image including the passing point in the travel direction. Like in the first embodiment, a route guide can be executed appropriately to follow actual road states. Further, in such a case, the in-vehicle navigation apparatus 11 need not hold map data. The above configuration of the system thus helps prevent problems in costs and workloads resulting from an in-vehicle navigation apparatus holding the map data.

Other Embodiments

The present invention is not limited only to the above-mentioned embodiments, and can be modified or extended as follows.

In the in-vehicle navigation apparatus 11, the course information displayed in the display device may include other figure information or text guidance.

Moreover, in the in-vehicle navigation apparatus 11, two types of route guides can be included. One is a route guide explained in the above first and second embodiments in which a passing point and course information, or vector information received from the center apparatus 31 are used without need of holding map data in the in-vehicle navigation apparatus 11. The other is a route guide in which map data held in the in-vehicle navigation apparatus 11 is used. Further, in such a case, the two types can be cooperatively used at the same time.

Furthermore, a passing point may be designated from the forward image in the vehicle travel direction captured by the in-vehicle camera by performing an image recognition of a road sign or signboard indicating a name of a place.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation system including a center apparatus and an in-vehicle navigation apparatus in a vehicle, the center apparatus being in communication with the in-vehicle navigation apparatus via a communication network,
    the center apparatus comprising:
    a center communication device configured to communicate with the in-vehicle navigation apparatus for receiving a received present position and a received destination from the in-vehicle navigation apparatus;
    a route calculation device configured to calculate a route from the received present position to the received destination by searching map data; and
    a center control device configured to extract a passing point in the route, calculate course information indicating a course at the passing point the vehicle is to take, and cause the center communication device to send the course information along with the passing point to the in-vehicle navigation apparatus,
    the in-vehicle navigation apparatus comprising:
    a present position designation unit configured to determine a current present position and to designate a designated present position;
    a destination designation unit configured to designate a designated destination;
    an in-vehicle communication device configured to communicate with the center apparatus for sending the designated present position and the designated destination and receiving the course information along with the passing point;
    a forward image capture unit configured to capture a forward image including the received passing point in a travel direction of the vehicle; and
    an in-vehicle control device configured to display (i) the captured forward image and (ii) the received course information, which is superimposed on the displayed forward image, when the current present position determined by the present position designation unit approaches the received passing point,
    wherein in the center apparatus, when the route calculation device calculates multiple routes from the received present position to the received destination by searching the map data,
    the center control device
        extracts a passing point included in one of the multiple routes, the one of the multiple routes being selected in the in-vehicle navigation apparatus,
        calculates course information indicating a course at the extracted passing point included in the one of the multiple routes, and
        causes the center communication device to send the calculated course information along with the passing point included in the one of the multiple routes to the in-vehicle navigation apparatus.

2. The navigation system of claim 1, wherein
in the in-vehicle navigation apparatus, the in-vehicle control device is further configured to perform an image processing to make a mobile object nondisplayed in the captured forward image in the travel direction to thereby cause the display device to display a forward image obtained after performing the image processing.

3. The navigation system of claim 1, wherein
in the in-vehicle navigation apparatus, the in-vehicle control device is further configured to extract a characteristic point of a road from the captured forward image to thereby cause the display device to display a shape of the road.

4. The navigation system of claim 1, wherein:
in the center apparatus, the center control device is further configured to search facility data and extract information on a facility around the passing point, and cause the center communication device to further send the extracted information on the facility to the in-vehicle navigation apparatus; and
in the navigation apparatus, the in-vehicle control device is further configured to cause the display device to superimpose the information on the facility received from the center apparatus via the in-vehicle communication device on the forward image in the travel direction.

5. The navigation system of claim 1, wherein
the passing point is an intersection at which a road branches with respect to the travel direction of the vehicle.

6. The navigation system of claim 1, wherein
the passing point is an intersection at which the travel direction of the vehicle turns.

7. A navigation system including a center apparatus and an in-vehicle navigation apparatus in a vehicle, the center apparatus being in communication with the in-vehicle navigation apparatus via a communication network,
    the center apparatus comprising:
    a communication device configured to communicate with the in-vehicle navigation apparatus for receiving a received present position and a received destination from the in-vehicle navigation apparatus;
    a route calculation device configured to calculate a route from the received present position to the received destination by searching map data; and
    a center control device configured to extract a passing point in the route, calculate vector information indicating a vector from the present position to the passing point and a vector from the present position to the destination, and cause the center communication device to send the vector information along with the passing point to the in-vehicle navigation apparatus,
    the in-vehicle navigation apparatus comprising:

a present position designation unit configured to determine a current present position and to designate a designated present position;

a destination designation unit configured to designate a designated destination;

an in-vehicle communication device configured to receive the vector information along with the passing point;

a forward image capture unit configured to capture a forward image including the received passing point in a travel direction of the vehicle; and an in-vehicle control device configured to display (i) the captured forward image and (ii) course information, which is based on the received vector information and is superimposed on the displayed forward image, when the current present position determined by the present position designation unit approaches the received passing point.

8. The navigation system of claim 7, wherein
in the in-vehicle navigation apparatus, the in-vehicle control device is further configured to perform an image processing to make a mobile object nondisplayed in the captured forward image in the travel direction to thereby cause the display device to display a forward image obtained after performing the image processing.

9. The navigation system of claim 7, wherein
in the in-vehicle navigation apparatus, the in-vehicle control device is further configured to extract a characteristic point of a road from the captured forward image to thereby cause the display device to display a shape of the road.

10. The navigation system of claim 7, wherein:
in the center apparatus, the center control device is further configured to search facility data and extract information on a facility around the passing point, and cause the center communication device to further send the extracted information on the facility to the in-vehicle navigation apparatus; and in the navigation apparatus, the in-vehicle control device is further configured to cause the display device to superimpose the information on the facility received from the center apparatus via the in-vehicle communication device on the forward image in the travel direction.

11. The navigation system of claim 7, wherein
the passing point is an intersection at which a road branches with respect to the travel direction of the vehicle.

12. The navigation system of claim 7, wherein
the passing point is an intersection at which the travel direction of the vehicle turns.

13. The navigation system of claim 7, wherein
in the center apparatus, when the route calculation device calculates multiple routes from the received present position to the received destination by searching the map data, the center control device
extracts a passing point included in one of the multiple routes, the one of the multiple routes being selected in the in-vehicle navigation apparatus, calculates vector information indicating vectors from the received present position to the passing point and from the received present position to the received destination, and causes the center communication device to send the vector information along with the passing point to the in-vehicle navigation apparatus.

* * * * *